United States Patent

Goldner

[15] 3,694,585

[45] Sept. 26, 1972

[54] CASSETTE TAPE PLAYOUT SENSING, INDICATION AND PROTECTING MEANS

[72] Inventor: Sandor Goldner, 222-Keap Street, Brooklyn, N.Y. 11211

[22] Filed: Aug. 19, 1970

[21] Appl. No.: 65,098

[52] U.S. Cl......179/100.2 S, 179/100.2 Z, 340/309.4

[51] Int. Cl.........................G11b 15/06, G11b 23/08

[58] Field of Search..179/100.2 S, 100.2 Z; 340/282, 340/309.4, 276

[56] References Cited

UNITED STATES PATENTS 3,497,635 2/1970 Schneider............179/100.2 S

FOREIGN PATENTS OR APPLICATIONS

44/18665 8/1969 Japan..................179/100.2 S

*Primary Examiner*—Bernard Konick

*Assistant Examiner*—Jay P. Lucas

*Attorney*—Polachek, Saulsbury & Hough

[57] ABSTRACT

Cassette tape protective means, comprises a tape cassette having a casing in which is a magnetic tape provided with a conductive leader and a conductive trailer at opposite ends. The casing has an opening for exposing the tape to parts of an end-of-tape sensing circuit in a cassette recorder. The end-of-tape sensing circuit includes a pair of spaced wiper contacts, a relay and an alarm device such as a lamp or buzzer. The drive motor of the recorder can be connected in circuit with the wiper contacts and a relay for automatically stopping the motor when the wiper contacts are reached by the trailer and leader.

3 Claims, 6 Drawing Figures

INVENTOR.
SANDOR GOLDNER
BY Polachek & Saulsbury
ATTORNEYS

CASSETTE TAPE PLAYOUT SENSING, INDICATION AND PROTECTING MEANS

This invention relates to the art of magnetic recording and playback by means of tape cassettes.

Heretofore magnetic tapes in cassettes have been driven in a cassette recorder in one direction during recording and playback. It has been very difficult to determine when the end of the magnetic tape has been reached with the result that the operator of the cassette may continue feeding an audio signal to the microphone of the tape recorder without realizing that tape drive has stopped and that no record is being made. If the tape is being played back, the tape drive may stop suddenly without the operator's realizing that the playback has actually ended.

The present invention solves this problem by providing a cassette tape protective means. The cassette includes a tape having a conductive leader and conductive trailer. A pair of wiper contacts in the cassette recorder senses the leader and trailer and actuates an end-of-tape sensing circuit including alarm means such as a lamp, buzzer or both.

It often happens that the thin magnetic tape in the cassette breaks at the leading end due to repeated strain put upon it when tape is repeatedly rewound and is suddenly stopped at the end of its runs. This strain is caused by the fact that the drive motor continues running while a clutch connecting the motor and tape drive slips. The present invention is adapted to actuate the end-of-tape alarm automatically at end of play and end of rewind. In addition the sensing circuit can be adapted to stop the tape drive automatically at both end of play and end of rewind without straining the tape.

Other and further features, objects and advantages of the invention will become apparent from the following detailed description taken together with the drawing, wherein.

Figures 1, 2, 2A, 3, 4, 5:
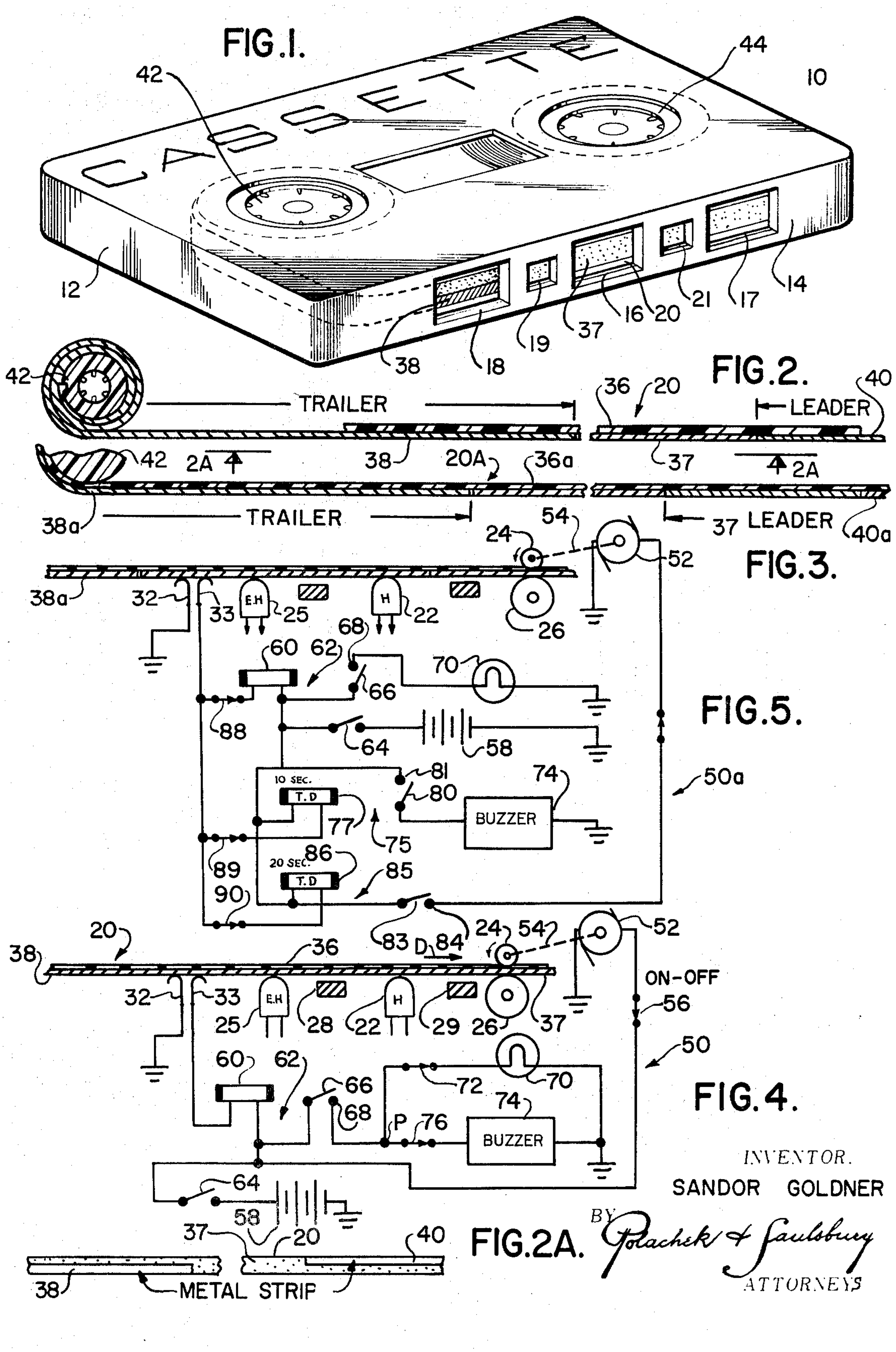
FIG. 1 is a perspective view of a tape cassette modified according to the invention.
FIG. 2 is a sectional view of a cassette tape, parts being broken away, showing leading and trailing ends, according to the invention.

FIG. 2*a* is a reduced side view of the tape taken on line 2*a*—2*a* of FIG. 2.

FIG. 3 is a view similar to FIG. 3 showing another cassette tape construction.

FIG. 4 and FIG. 5 are diagrams showing parts of cassette tape recorder circuits having end-of-tape sensing means actuated by the tapes of FIGS. 2 and 3.

Referring first to FIGS. 1 and 4, there is shown a cassette 10 including a flat rectangular casing 12. In narrow bottom wall 14 is a plurality of rectangular openings. Central opening 16 exposes tape 20 from which magnetic signals can be picked up by a magnetic head 22 in recorder circuit 50 shown in FIG. 4. Right opening 17 exposes the tape for engagement by a capstan 24 and idler roller 26. Left opening 18 exposes the tape to erase head 25. Holes 19 and 21 receive mechanical locating members 28, 29 in the recorder, to hold the cassette in position in the recorder. To the extent described the cassette 10 is conventional.

Now according to the invention, wiper contacts 32, 33 in the cassette recorder are disposed adjacent to the erase head 25 for contacting tape 20. The tape 20 has a plastic base 36 on one side of which is a magnetic coating 37 upon which signals can be recorded magnetically by head 22 and from which the signals can be picked up magnetically by head 22. During recording erase head 25 will erase previously recorded signals. On the lower half of the trailing end of base 36 is secured a strip 38 made of metal foil; see FIGS. 1, 2, 2a and 4. Similarly another strip 40 of metal foil can be attached to the upper half of the leading end of tape 20. The metal strips 38 and 40 may serve as trailer and leader respectively of the tape. The trailer and leader are wound and secured at their outer ends upon reels 42, 44 in the cassette casing 12.

In the circuit 50 shown in FIG. 4, tape 20 is shown being driven from left to right in normal fashion during recording or playback. Capstan 24 and idler roller 26 engage the tape to drive it in direction D. Motor 52 is operatively connected to the capstan via drive mechanism 54. The motor is connected via an ON-OFF switch 56 to power supply 58. Coil 60 of a relay 62 is connected in series with a switch 64, wiper contacts 32, 33 and power supply 58. Normally open contacts 66, 68 of the relay are connected in series with power supply 58, the switch 64 and point P. At point P is a parallel circuit including lamp 70 in series with a switch 72, and a buzzer 74 in series with a switch 76. Point P is connected to contact 68.

In operation of the tape cassette and tape recorder circuit, the tape will be driven from left to right during recording or playback. When conductive trailer 38 reaches contacts 32, 33, relay 62 will be energized and contacts 66, 68 will close. This will cause the lamp 70 to light and buzzer 74 to sound. These are the end-of-tape alarms. Either switch 72 or switch 76 can be opened to deactivate either alarm. Switch 64 can be opened to de-activate the entire circuit. Switch 56 will be opened when either alarm is actuated to stop the motor. When the tape drive 54 is reversed in conventional fashion to rewind tape 20, the end-of-tape circuit will be activated and alarms will be actuated again when conductive leader 40 reaches contacts 32, 33, as described above.

FIG. 3 shows another tape 20A which is similar to tape 20 except that the trailer **38*a* and leader 40*a* are conductive coatings on upper and lower halves respectively at opposite ends of the tape base 36*a*. Other parts of the tape are as shown in FIGS. 2 and 4** and are identically numbered.

FIG. 5 shows end-of-tape sensing circuit 50A which has the capability of stopping the tape drive automatically when the tape leader and trailer reach contacts 32, 33. Parts of the circuit corresponding to those of circuit 50 are numbered the same. Tape 20 or 20A can be used. In this instance tape 20A is shown being driven by capstan 24 and roller 26 via tape drive 54 which is driven by motor 52. Only lamp 70 is connected in series with contacts 66, 68 of relay 62. Buzzer 74 is connected in series with normally open contacts 80, 81 of a time delay relay 75. This relay has a coil 77 which may require a predetermined time such as ten seconds to warm up before it closes contacts 80, 81. Motor 52 is connected in series with normally closed contacts 83, 84 of another time delay relay 85. The coil 86 of this relay may require a predetermined time such as twenty seconds to warm up before contacts 83, 84 open. Relay coils 60, 77 and 86 are all connected to power supply 58. Switches 88, 89 and 90 are connected in series with the relay coils for selectively deactivating the relays.

When either trailer 38*a* or leader 40*a* reach the spaced, normally open contacts 32, 33, lamp 70 will light first as relay 62 becomes energized. Then after relay 75 warms up, contacts 66, 68 will be closed and the buzzer will sound. Thereafter if switch 56 is not manually opened, relay 85 will warm up and contacts 83, 84 will open to stop the motor so that the tape drive stops. This will prevent the tape from running up to the reels at either end. Switch 64 can be opened to deactivate the relays and restore all contacts to the condition shown in FIG. 5.

By the arrangement described, end-of-tape alarms are selectively actuated at either end of the tape. In addition the tape drive can be stopped automatically by use of the facilities of circuit 50A. Where double track cassette tape is used, the functions of leader and trailer will automatically be reversed when the cassette is turned over in the cassette recorder to playback or record on the second track.

The invention can be applied to the manufacture of tape cassettes at negligible cost. It is only necessary to add a conductive leader and trailer at ends of the tape for contact by contacts 32, 33. The invention can be applied to new and existing cassette recorders by addition of the circuitry shown in FIGS. 4 or 5. This can be done at low cost at the factory or by any competent recorder service technician.

The invention will make it possible to lengthen the useful lives of cassette tapes and will increase the versatility and utility of both cassette tapes and cassette recorders.

Although a limited number of embodiments of the invention have been described, it will be apparent that many modifications can be made without departing from the invention as defined in the claims. If desired, a special opening can be provided in bottom wall 14 of the cassette for insertion of wiper contacts 32, 33.

What is claimed is:

1. Cassette tape protective means comprising a cassette having a casing insertable into a cassette tape recorder; a magnetic tape in said casing engaged at opposite ends upon rotatable reels; a conductive trailer at one end of the tape; and a conductive leader at the other end of the tape, said leader and trailer being respectively engaged on rotatable reels in the casing, said casing having a wall with spaced openings for engagement by a tape drive capstan, for contact by an erase head, by a recording playback head, and by operative parts of an end-of-tape sensing circuit in the cassette recorder; said protective means further comprising an end-of-tape sensing circuit, said circuit comprising a pair of spaced wiper contacts disposed for insertion into one of said openings in the casing to contact the tape; a power supply; a relay connected in circuit with said wiper contacts and said power supply; and alarm means connected in circuit with the power supply and relay for actuation when said wiper contacts contact the conductive trailer and the conductive leader to indicate that an end of the tape is approaching one of said heads in the recorder; a motor operatively arranged to drive the tape between said reels, and another relay connected in circuit with said motor, power supply and wiper contacts for stopping the motor and drive of the tape when the wiper contacts contact the conductive trailer and conductive leader; said alarm means being a lamp; a further relay and a buzzer connected in circuit with said power supply and wiper contacts for sounding when the wiper contacts contact the conductive trailer and conductive leader; and the first named, other and further relays all having different time delay characteristics, such that the lamp is lighted, the buzzer is sounded and the motor is stopped at different times after the wiper contacts contact the trailer and leader.

2. Cassette tape protective means as defined in claim 1, wherein the conductive leader and trailer are disposed on upper and lower halves respectively of the tape.

3. Cassette tape protective means as defined in claim 1, wherein said other relay has a time delay characteristic so that the motor is stopped only a predetermined time after said alarm is actuated.

* * * * *